United States Patent [19]
Lizet et al.

[11] Patent Number: 4,740,951
[45] Date of Patent: Apr. 26, 1988

[54] REVERSIBLE DEVICE FOR THE DEMULTIPLEXING OF SEVERAL LIGHT SIGNALS IN INTEGRATED OPTICS

[75] Inventors: Jacques Lizet; Serge Valette, both of Grenoble, France

[73] Assignee: Commissariat a l'Energie Atomique, Paris, France

[21] Appl. No.: 839,704

[22] Filed: Mar. 13, 1986

[30] Foreign Application Priority Data

Mar. 13, 1985 [FR] France ................. 85 03681

[51] Int. Cl.$^4$ ........................... H04B 9/00
[52] U.S. Cl. ................... 370/3; 350/96.11; 350/96.12; 350/96.19
[58] Field of Search ........... 350/96.11, 96.12, 96.18, 350/96.19; 370/2, 3

[56] References Cited

U.S. PATENT DOCUMENTS

| 3,814,498 | 6/1974 | Tomlinson, III et al. | 350/96.19 |
| 4,449,782 | 5/1984 | Korth | 350/96.19 |
| 4,547,262 | 10/1985 | Spillman, Jr. et al. | 350/96.12 |

FOREIGN PATENT DOCUMENTS

| 171615 | 2/1986 | Eoropean Pat. Off. | 350/96.11 |
| 54-38143 | 3/1979 | Japan | 350/96.19 |
| 2105863 | 9/1981 | United Kingdom . | |

OTHER PUBLICATIONS

Spear-Zino et al-"Multiwavelength Monolithic-"SPIE vol. 239, Guided Wave Optical & Surface Wave Devices Systems and Applications 1980, pp. 293-298.
Stutius-Silicon Nitride Films-Applied Optics-vol. 16, #12 Dec. 1977, pp. 3218-3222.
Applied Physics Letters, vol. 40, No. 2, Jan. 1982.
Soviet Physics/Technical Physics, vol. 26, No. 6, Jun. 1981.

*Primary Examiner*—Joseph A. Orsino, Jr.
*Attorney, Agent, or Firm*—Cesari and McKenna

[57] ABSTRACT

A reversible device for demultiplexing several light signals in integrated optics is more particularly intended to separate n light signals of different wavelengths forming a light beam and transmitted by a first optical fiber and for respectively reinjecting into n second optical fibers the n light signals. Produced in a light guide, it comprises achromatic input optics for rendering parallel said light beam, n gratings arranged in cascade form and operating under Bragg conditions, each grating serving to diffract that part of the light beam carrying one of the n light signals and transmitting the not yet diffracted part of said light beam in the direction of the following grating, as well as n output optics associated with n gratings, each output optics being used for focussing that part of the light beam diffracted by the associated grating.

24 Claims, 3 Drawing Sheets

REVERSIBLE DEVICE FOR THE DEMULTIPLEXING OF SEVERAL LIGHT SIGNALS IN INTEGRATED OPTICS

BACKGROUND OF THE INVENTION

The present invention relates to a device for multiplexing or demultiplexing several light signals in integrated optics. It is more particularly used in the fields of processing radar signals in real time, optical telecommunications, optical fiber sensors, etc.

The multiplexing of light signals of different wavelengths in integrated optics is very important in optical telecommunications, because it makes it possible to carry within the same optical fibre a large information quantity with constant pass bands.

A demultiplexing device or demultiplexer in integrated optics makes it possible to separate n light signals of different wavelengths carried by the same first optical fiber and respectively inject said n light signals into n second optical fibers. Conversely, a multiplexing device or multiplexer makes it possible to regroup into a single beam, n light signals of different wavelengths respectively from n optical fibers.

In such devices, two major problems occur. The first problem is to ensure the multiplexing function, i.e. at the output of the device the ith second optical fiber, i being an integer between 1 and n, may only carry the wavelength $\lambda_l$, to within $\Delta\lambda/2$. Thus, the ideal multiplexing element is a square wave pulse filter of width $\pm\Delta\lambda/2$ and of transmission 1 if $\lambda_i - \Delta\lambda/2 < \lambda < \lambda_i + \Delta\lambda/2$, which would reflect or conversely transmit in a perfect manner the light signals whose wavelengths are not in said range and conversely would transmit or reflect those whose wavelengths are within said range. A succession of such filters would form the ideal multiplexer.

The second major problem is the coupling of the multiplexer with generally monomode optical fibers carrying light informations. Thus, the light losses at the input and output of the multiplexer must be as small as possible.

In the presently known multiplexers in integrated optics, the multiplexer function, i.e. the chromatic dispersion of the different light signals is ensured by a grating, as in conventional optics. Such a multiplexer is more particularly described in an article in Applied Optics, vol. 21, no. 12, of June 15, 1982, pp. 2195 to 2198 by T. SUHARA et al entitled "Integrated-Optic Wavelength Multi- and Demultiplexers Using a Chirped Grating and an Ion-Exchanged Waveguide".

Unfortunately, these multiplexers do not solve the most important problem regarding the coupling of the multiplexer and monomode optical fibers used for carrying light information, as well as that of the collimation of the light beam, which acts on the dispersive element or grating of the multiplexer.

SUMMARY OF THE INVENTION

The present invention specifically relates to a device for the reversible demultiplexing of several light signals in integrated optics making it possible to obviate the disadvantages referred to hereinbefore. In particular, it permits a good coupling with the optical fibers used for the carrying of information and consequently low light losses.

Moreover, it permits in an easier manner than in the prior art devices, the multiplexing of several light signals of different wavelengths, e.g., up to eight signals, while retaining acceptable total light losses. Moreover, the multiplexer or demultiplexer according to the invention can be produced in accordance with completely reproducible technology.

The present invention specifically relates to an integrated demultiplexer for separating n light signals of different wavelengths, constituting an incident light beams transmitted by a first optical fiber and respectively reinjecting into n optical fibers the n light signals, said demultiplexer formed from optical components produced in at least one light guide comprising, in the guide, an achromatic input optics for making parallel the incident light beam from the first optical fiber, at least n gratings arranged in cascade, operating under Bragg conditions, each grating being used to diffract a first part of the light beam and transmit a second part of said light beam, one of the two parts only carrying one of the n light signals, the other part carrying the other light signals, being transmitted in the direction of the following grating and n output optics associated with the n gratings, each output optics being used to focus that part of the light beam only transmitting one of the light signals and wherein the demultiplexer is reversible.

The demultiplexer according to the invention is reversible, i.e. it permits either the demultiplexing, or the multiplexing of light signals. In the multiplexing sense, the device is used for injecting into the first fiber an outgoing light beam containing n light signals coming respectively from the n optical fibers. In this case, the input optics act as output optics, the gratings being used for combining two light beams and the n output optics act as n input optics.

Throughout the remainder of the present text, the device according to the invention will be described in the demultiplexing sense.

The achromatic input optics advantageously constituted by a parabolic mirror ensures the collimation of the light beam having to be processed in the multiplexing device. Thus, it enables the gratings to work under Bragg conditions and consequently ensures a good wavelength selection.

According to a preferred embodiment of the device according to the invention, the part only carrying one of the n light signals is the part of the light beam diffracted by the corresponding grating.

Advantageously, the device according to the invention comprises an input microguide, placed between the first optical fiber and the input optics, having a structure similar to that of the first optical fiber and/or output microguides respectively placed between the n output optics and the n second optical fibers, respectively having a structure similar to those of the second optical fibers.

The use of an input microguide and n output microguides, having a structure very close to that respectively of the input and output optical fibres makes it possible to ensure a good coupling between said fibers and the multiplexer, thus limiting the light losses at the entrance and exit to the device. Preferably, the output microguides of the multiplexer are curved.

According to another preferred embodiment of the device according to the invention, the output optics of said device are achromatic parabolic mirrors. These mirrors permit a good focussing of the light beams respectively entering the different second optical fiber.

According to another preferred embodiment of the device according to the invention, the optical components are formed in two superimposed light guides, a lower guide with a high index variation and an upper guide with a smaller index variation in which the incident light beam propagates. In such a structure, the multiplexer comprises n first gratings, each being used to diffract a first part of the light beam and transmit a second part of said light beam, one of the two parts only carrying one of the n light signals, the other part transmitting the other light signals being carried in the direction of the first following grating, the part only carrying one of the n light signals then being transferred from the upper guide to the lower guide, as well as n second gratings associated with the first gratings and each being used for retransferring that part of the light beam only carrying one of the n light signals from the lower guide to the upper guide.

The use of two superimposed light guides makes it possible, if necessary, to proces the light signals during their propagation in the light guide with a high index variation.

Advantageously, the optical elements of the multiplexer are formed by etching at least part of the light guide.

According to a preferred embodiment of the device according to the invention, produced in order on a silicon substrate, the light guide comprises a first undoped silicon dioxide layer, a second doped silicon dioxide layer and a third optionally doped silicon dioxide layer with an element reducing the refractive index of said third layer, the doping of the material of the second layer being such that its refractive index is higher than that of the first and third layers.

According to another preferred embodiment of the device according to the invention, the two light guides comprise, produced in order on a semiconductor and in particular a silicon substrate, a first layer, e.g. of undoped silicon dioxide, a second layer more particularly of silicon nitride, a third layer, e.g. of doped silicon dioxide and a fourth layer, more particularly of silicon dioxide optionally doped with an element reducing the refractive index of said fourth layer, the third layer being such that its refractive index is higher than that of the first and fourth layers and lower than that of the second layer, the first, second and third layers forming the lower light guide and the first, third and fourth layers forming the upper light guide.

BRIEF DESCRIPTION OF THE DRAWINGS

The invention is described in greater detail hereinafter relative to non-limitative embodiments and the attached drawings, wherein show:

FIG. 5 Diagrammatically and in plan view, a multiplexer according to the invention produced in two superimposed light guides.

DETAILED DESCRIPTION OF THE PREFERRED EMBODIMENTS

Figure 1:
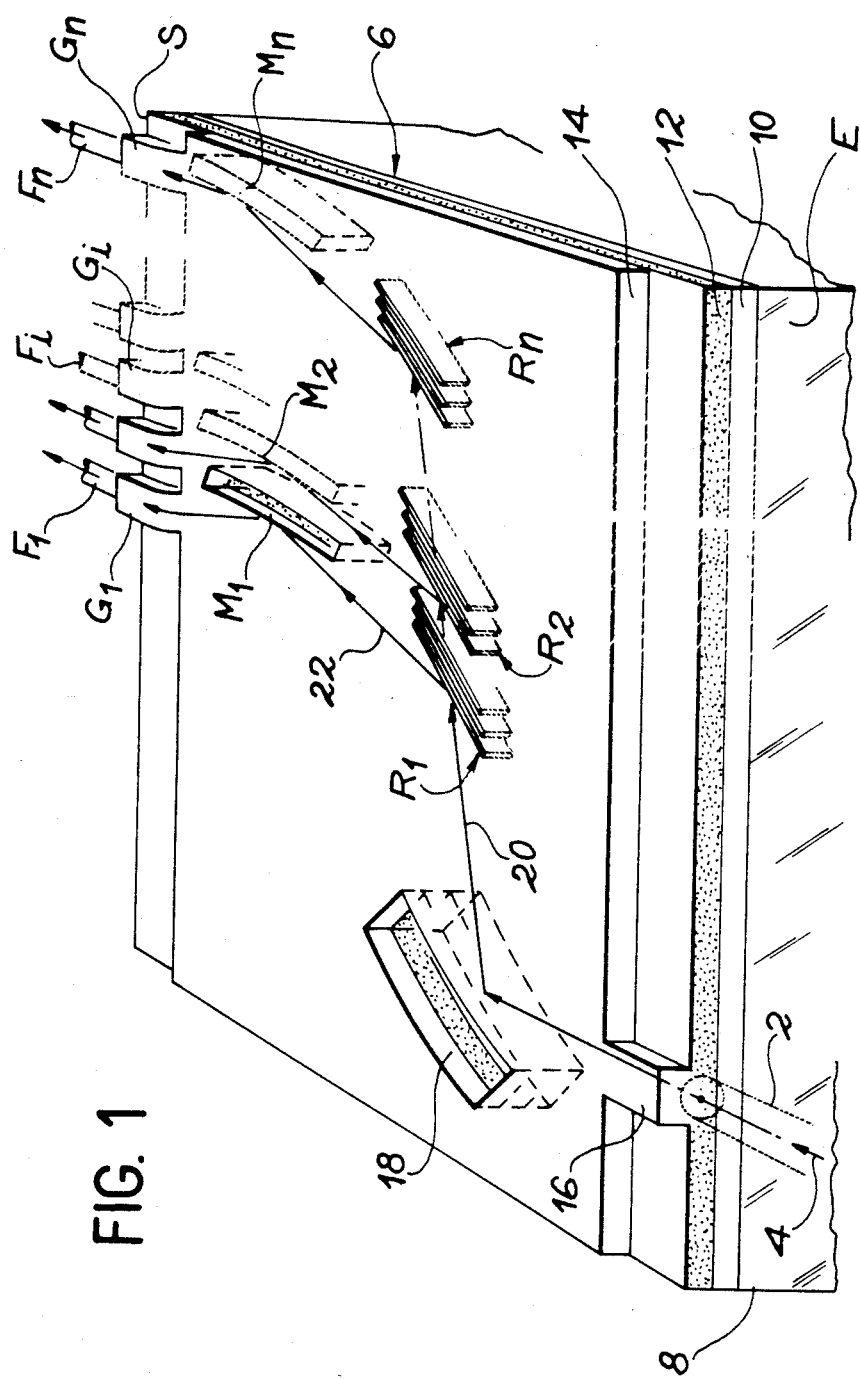
FIG. 1 Diagrammatically and in perspective a multiplexing device according to the invention produced in a single light guide.
Figure 2:
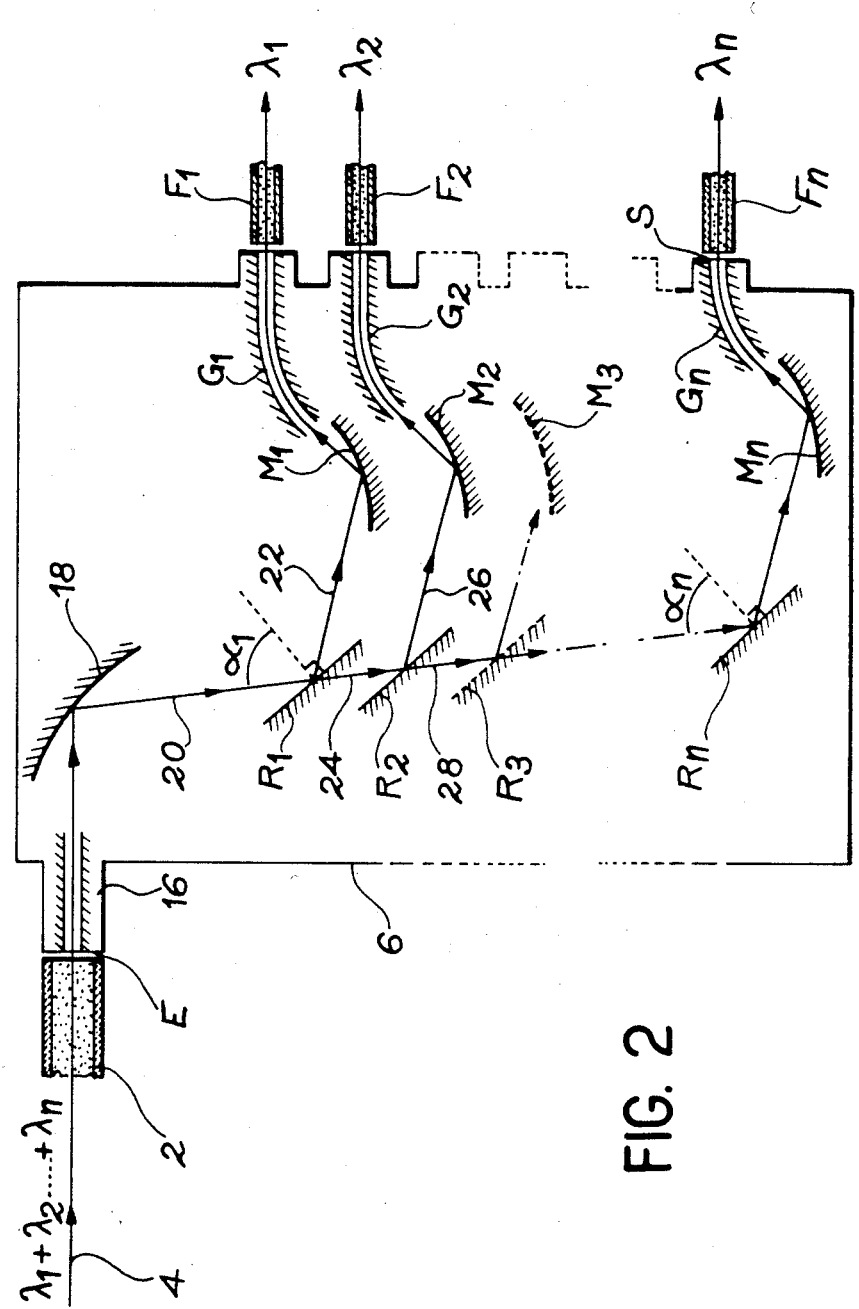
FIG. 2 Diagrammatically and in plan view the multiplexer of FIG. 1.

FIGS. 1 and 2 diagrammatically show an integrated multiplexing device or multiplexer according to the invention used for separating n light signals, respectively of wavelengths $\lambda_1, \lambda_2, \ldots, \lambda_n$, transmitted by a first optical fibre 2, particularly of silica, and for respectively reinjecting into n second optical fibers $F_1, F_2, \ldots, F_n$, the n light signals. In particular, optical fiber $F_1$ only receives the light signal of wavelength $\lambda_1$ and optical fiber $F_n$ only receives the light signal of wavelength $\lambda_n$. Wavelengths $\lambda_1, \lambda_2, \ldots, \lambda_n$ can be between 0.7 and 1.8 $\mu$m. The n light signals carried by the first optical fiber 2 form a single incident light beam 4.

As shown in FIG. 1, this multiplexer comprises a light guide 6 produced on a monocrystalline semiconductor substrate 8, e.g. of silicon or formed from a III-V material, such as GaAs. The substrate is obtained by cleaving a semiconductor block, so as to have strictly parallel faces E and S.

Light guide 6 is formed from three superimposed layers respectively 10, 12 and 14. Layer 12, placed between layers 10 and 14, forms the guiding layer of the guide. Its refractive index is higher than that of layers 10 and 14. For example, the lower layer 10 surmounting the substrate 8 is made from pure silicon dioxide, layer 12 from silicon dioxide more particularly doped with phosphorus, germanium or titanium and the upper layer 14 is of either pure silicon dioxide or silicon dioxide doped with an element such as boron or fluorine, reducing the refractive index of said layer. Pure oxide layers 10 and 14 have, for the same length of approximately 0.8 $\mu$m, a refractive index of e.g. 1.45, whereas the doped oxide layer 12 has an index of 1.46. This light guide with a low index variation has characteristics similar to those of monomode optical fibers made from silica and which are generally used in integrated optics. Its low index variation makes it possible to stay monomodal, even for a 10 $\mu$m guidance layer 12. The different optical components of the muliplexer are integrated into light guide 6.

At its entrance E, the multiplexer has a microguide 16, making it possible to ensure a good coupling between the first optical fiber 2 carrying light signals of different wavelengths and the multiplexer. This input microguide 16 has a structure very similar to that forming the optical fiber 2, which is in particular a monomode fiber made from silica or silicon dioxide. Microguide 6, as shown in FIG. 2, is preferably a rectilinear microguide.

Figure 3:
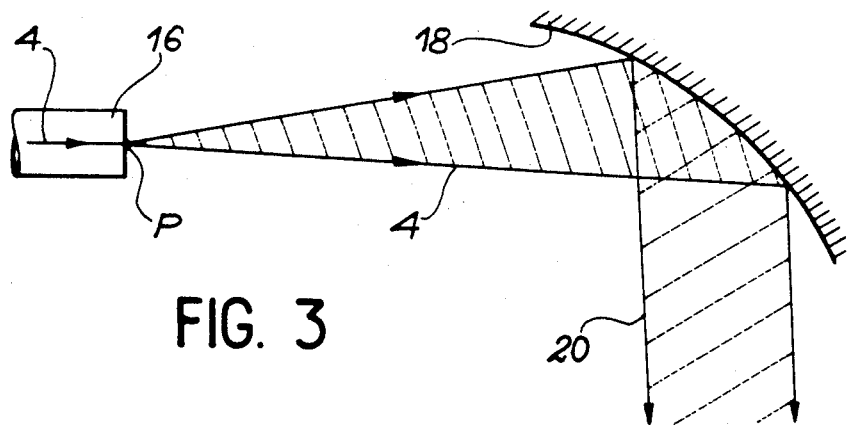
FIG. 3 Diagrammatically the input element of the device of FIG. 1 ensuring the collimation of the light beam to be processed.

An achromatic optics 18, such as a parabolic achromatic mirror makes it possible to collimate the light beam 4 from input microguide 6 and containing light signals of different wavelengths. In other words, said optics 18 make it possible to transform, as shown in FIG. 3, the light from microguide 16 likened to a light spot P into a parallel light beam 20 and for this purpose light spot P must be located at the focal point of optics 18.

Figure 4A:
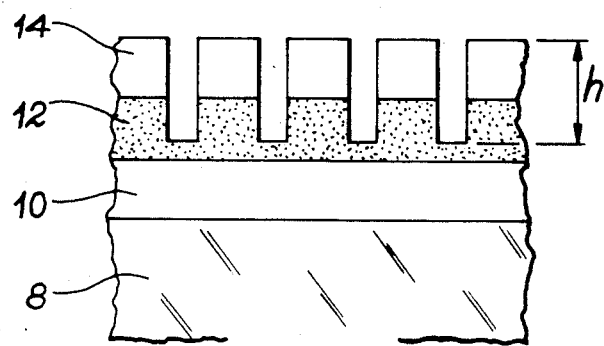
FIGS. 4a and 4b respectively in longitudinal section, two possible structures for the grating of the multiplexer according to the invention.

The parallel light beam 20 from parabolic mirror 18, as shown in FIG. 2, acts on n gratings $R_1, R_2, \ldots, R_n$ arranged in cascade and operating under Bragg conditions. These gratings are periodic structures and have, in the form of regularly spaced parallel bands, an alternating sequence of depressions and protuberances (FIG. 4a).

For example, the first grating $R_1$ makes it possible to diffract that part of light beam 22 carrying the light signal of wavelength $\lambda_1$, and transmit the remainder 24 of the light beam containing the other light signals. Part 24 of the incident beam 20 transmitted by the first grating $R_1$ is received by the second grating $R_2$. In turn, the latter diffracts that part 26 of light beam 24 containing the optical signal of wavelength $\lambda_2$ and transmits the remainder 28 of light signal 24 on the third grating $R_3$. The n light signals of different wavelengths respectively $\lambda_1, \lambda_2, \ldots, \lambda_n$ are separated from one another and transmitted to the corresponding optical fibers $F_1, F_2, \ldots, F_n$.

The Bragg or incidence angle $\alpha_i$ of the grating $R_1$, i being an integer between 1 and n, marked with respect to the normal to said grating, is chosen as a function of the technological realization possibilities of the structure of the different gratings. This angle $\alpha_i$ is dependent on the wavelength $\lambda_i$ to be diffracted, as well as on the spacing of the corresponding grating $p_i$. In particular, the ith grating $R_i$ can be defined in such a way that it reflects the wavelength $\lambda_i$ and transmits the others and for this purpose, it is necessary that $\lambda_i = 2p_i \sin \alpha h d\, i$. This condition can be satisfied by choosing the spacing $p_i$ of grating $R_i$ and by varying $\alpha_i$ so as to carry out a wavelength selection, or alternatively keep $\alpha_i$ constant and vary the spacing $p_i$ of the grating. For practical reasons in connection with the production of the different gratings $R_1, R_2, \ldots, R_n$, it is preferable to fix the spacing $p_i$ and to vary $\alpha_i$.

Following gratings $R_1, R_2, \ldots, R_n$, the diffracted light beams, such as 22 and 26, are not longer strictly parallel beams. However, as all these beams must exit perpendicularly to a cleaved face of silicon substrate 8, i.e. parallel or perpendicular to the entrance face E of the light guide, e.g. the parallel face S, n optical elements $M_1, M_2, \ldots, M_n$ are provided for focussing the light beams diffracted by the different gratings. Each mirror $M_i$ is associated with a grating $R_i$ and makes it possible to focus that part of the light beam diffracted by said grating $R_i$.

So as to improve the coupling at the output of the multiplexer with the different optical fibers $F_1, F_2, \ldots, F_n$, n light microguides respectively $G_1, G_2, \ldots, G_n$ are respectively placed between the mirrors $M_1, M_2, \ldots, M_n$ and the optical fibers $F_1, F_2, \ldots, F_n$. Each microguide $G_i$ has a structure very close to that of the corresponding optical fiber $F_i$ receiving the light signal of wavelength $\lambda_i$. As for the input microguide 16 (FIG. 3), the focal points of the optical elements $M_1, M_2, \ldots, M_n$ are located at the entrance of the corresponding microguide $G_1, G_2, \ldots, G_n$.

Preferably, these microguides have a curved shape, which helps to bring about the exiting of the different light signals diffracted by gratings $R_1, R_2, \ldots, R_n$, respectively carrying the light signal $\lambda_1, \lambda_2, \ldots, \lambda_n$, perpendicular to the cleaved face S of the monocyrstalline silicon substrate 8.

A description will now be given of the process for the production of the aforementioned multiplexer, in the case of a monocrystalline silicon substrate and a silicon dioxide light guide.

The first stage consists of growing by thermal oxidation of the substrate, the lower silicon dioxide layer 10 with a thickness of 1 to 5 $\mu$m. This growth can be obtained at low temperature between 800° and 850° C. and under a pressure of approximately $10^6$ Pa, or at a higher temperature between 1000° and 1150° C. under atmospheric pressure.

This is following by the deposition by a chemical vapor phase deposition process, which may or may not be plasma assisted, of the silicon dioxide layer 12 doped with phosphorus, germanium or titanium. This doped silicon dioxide layer has a thickness between 4 and 10 $\mu$m. By acting on the dopant quantity introduced, e.g. $10^{21}$ to $10^{22}$ atoms/cm$^3$ for phosphorus, it is possible to adapt the index difference between doped layer 12 and the lower layer 10/upper layer 14, whereby an index difference of $10^{-3}$ may be adequate.

The third silicon oxide layer can be deposited by a chemical vapor phase deposition process, which may or may not be plasma assisted. Layer 14 can be of pure oxide or oxide doped with an element reducing the refractive index of said layer, such as boron or fluorine. This upper layer has a thickness between 1 and 6 $\mu$m.

The following stages consist of etching the thus formed light guide through an appropriate mask, in accordance with conventional photolithography processes, so as to form the different optical components.

In order to obtain optical elements with a perfectly defined shape, use will be made of aniostropic etching, such as e.g. reactive ionic etching using as the etching agent carbon tetrafluoride or trifluomethane.

For forming the input microguide 16 and the output microguides $G_1, G_2, \ldots, G_n$, it is only possible to eliminate those parts of the upper silicon dioxide layer 14 not facing the optical fibre 2 for supplying the signals and the optical fibers $F_1, F_2, \ldots, F_n$ for the discharge of said signals, as shown in FIG. 1.

For forming the entrance parabolic mirror 18 and exit parabolic mirrors $M_1, M_2, \ldots, M_n$, it is possible to simultaneously eliminate the three oxide layers 10, 12 and 14 at the intended locations of these mirrors.

With regards to gratings $R_1, R_2, \ldots, R_n$, in the manner shown in FIG. 4a, it is possible to eliminate the upper layer 14 of the light guide and in part the guide layer 12 at the locations provided for said gratings. The depth of the etched grooves h is determined by the desired pass band $\Delta\lambda$, which is dependent on the "force" of the grating. The greater the depth h, the finer the wavelength selection (small $\Delta\lambda$).

Figure 4B:
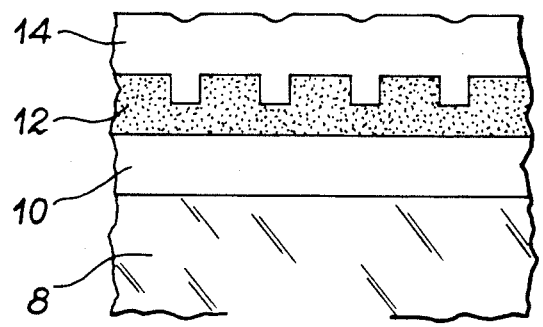

In a variant of the production process for the device according to the invention, only lower layer 10 and guide layer 12 of the light guide are deposited in accordance with the same deposition procedures. Then, using an appropriate mask, defined in accordance with conventional photolithography processes, there is a partial etching of the guide layer 12, as shown in FIG. 4b, in order to form the different gratings, Said etching is in particular an anisotropic etching, such as e.g. a reactive ionic etching.

Following this etching, on the complete structure is deposited a pure silicon dioxide layer, whose thickness corresponds to that of the upper layer 14 of the light guide. This deposit can be produced by a plasma-assisted, chemical vapor phase deposition process.

The other optical elements (mirrors, microguides) are produced as herein before by etching one or more layers of the light guide.

FIG. 5 shows in perspective another embodiment of the multiplexer according to the invention. The optical elements of this device fulfil the same functions as those described hereinbefore relative to FIGS. 1 and 2 and they carry the same references followed by the letter "a" or the symbol "'''".

This multiplexer makes it possible to separate the n light signals of wavelength $\lambda_1, \lambda_2, \ldots, \lambda_n$ carried by optical fiber 2 and reinject them respectively into the n second optical fibers $F_1, F_2, \ldots, F_n$. This device comprises two superimposed light guides $6a$, a lower guide with a high index variation and an upper guide with a lower index variation.

These two superimposed light guides $6a$ are produced on a monocrystalline semiconductor substrate $8a$, particularly made from silicon and are formed by a stack of four layers, respectively $10a, 11, 12a, 14a$. The median layers 11 and $12a$ respectively correspond to the guide layers of the lower and upper guides. Layer 11 has a higher refractive index than that of layers $10a, 12a$ entering into the construction of the lower guide and layer $12a$ has a higher refractive index than that of a layer $10a$ and layer $14a$ involved in the construction of the upper light guide.

In the case of a silicon substrate $8a$, layer $10a$ can be made from undoped silicon dioxide, e.g. obtained by thermal oxidation of the substrate at 800° to 850° C. under $10^6$ Pa, or at a higher temperature between 1000° and 1150° C., under atmospheric pressure. It, e.g., has a refractive index of approximately 1.58 for a wavelength of 0.8 $\mu$m and a thickness of 1 to 5 $\mu$m. Layer 11 is advantageously made from silicon nitride, which has a high refractive index of approximately 2 for the same length. This layer can, e.g., be deposited on layer $10a$ by the chemical vapor phase deposition process, which may or may not be plasma assisted. It in particular has a thickness between 0.01 and 0.2 $\mu$m.

Layer $12a$ can be formed from silicon dioxide, more particularly doped with phosphorus, germanium or titanium. It has a refractive index which is slightly higher than that of layer $10a$ (higher by a few $10^{-3}$) and a thickness of 2 to 10 $\mu$m. It can be deposited on layer 11, e.g., by a chemical vapor phase deposition process, which may or may not be plasma assisted. Upper layer $14a$ can also be a silicon dioxide layer 4, either of pure silicon dioxide or that doped by elements reducing the refractive index of said layer, such as boron or fluorine. It can be formed by a chemical vapor phase deposition process, which may or may not be plasma assisted. It has a refractive index of approximately 1.45 for a wavelength of 0.8 $\mu$m and a thickness between 1 and 6 $\mu$m.

The upper guide with a small index difference, an index difference of $10^{-3}$ being adequate between the guide layer and the adjacent layers, ensures a good coupling with the optical fibre 2 transmitting the different signals to be separated and with the optical fibres for the discharge of the various signals, respectively $F_1, F_2, \ldots, F_n$. This upper guide is a monomode guide, like optical fibres 2 and $F_i$, even for a 10 $\mu$m guide layer $12a$. The transmission of the incident light beam 4 in the multiplexer is ensured by its upper guide.

The lower guide with a high index variation (e.g. 0.55) provides a better possibility for processing light signals than the guide with a low index variation. Thus, it is easy to realize in guide layer 11 with a high index ($Si_3N_4$), optical components such as lenses, polarizers, etc., whereas these elements cannot be produced in the guide layer $12a$ with a low index.

As hereinbefore, this multiplexer comprises an e.g. rectilinear input microguide $16a$ of the same structure as optical fibre 2 making it possible to limit the light losses at the entrance to the multiplexer, an achromatic input optics $18a$ such as a parabolic mirror making the light beam from the microguide $16a$ parallel, together with n first gratings $R_1', R_2', \ldots, R_n'$, arranged in cascade form and operating under Bragg conditions.

As hereinbefore, each grating $R_i'$, i ranging between 1 and n, is used for diffracting that part of the light beam transmitting the light signal of waveguide $\lambda_i$, while transmitting the remainder of the light beam in the direction of the following grating $R_{i+1}'$. These gratings $R_1', R_2', \ldots, R_n'$ are designed for coupling the upper guide mode with the lower guide mode. Thus, apart from the wavelength selection, they make it possible to transfer the light beam diffracted by them from the upper guide to the lower guide and more precisely from the doped silicon dioxide guide layer $12a$ to the silicon nitride guide layer 11.

As a result of this transfer from one light guide to the next, it is necessary to associate with said grating $R_i'$, a grating $T_i$ acting as reflecting optics, making it possible to transfer the light beams diffracted by grating $R_i'$ from the lower guide to the upper guide, i.e., from guide layer 11 to guide layer $12a$.

The light beams respectively reflected by gratings $T_1, T_2, \ldots, T_n$ are then respectively focussed by means of optical elements $M_1', M_2', \ldots, M_n'$, such as parabolic achromatic mirrors, on to second optical fibers $F_1, F_2, \ldots, F_n$ respectively, carrying the light signals of wavelengths $\lambda_1, \lambda_2, \ldots, \lambda_n$. Curved output microguides respectively $G_1', G_2', \ldots, G_n'$ can be advantageously placed respectively between optics $M_1', M_2', \ldots, M_n'$ and optical fibers $F_1, F_2, \ldots, F_n$ in order to aid the coupling of the multiplexer and optical fibers $F_1, F_2, \ldots, F_n$.

As previously, the output mirrors $M_1', M_2', \ldots, M_n'$ and the output microguides $G_1', G_2', \ldots, G_n'$ make it possible to pass out the diffracted light beam, each carrying a single signal, perpendicular to a cleaved face of the substrate.

The Bragg or incidence angles of the gratings $R_1', R_2', \ldots, R_n'$ and gratings $T_1, T_2, \ldots, T_n$ are determined as a function of the effective index of the two guides in which are produced the different optical elements of the multiplexer. These effective indexes are dependent on the thickness and refractive index of the layers forming the guides.

The different optical elements of this multiplexer can be produced, as hereinbefore, by partly etching using reactive ionic etching, the layers of the two guides using $CHF_3$ or $CF_4$ as the etching agent. Microguides $16a$ and $G_1'$ can be obtained by only etching the upper layer $14a$, mirrors $18a$ and $M_1'$ by etching the four layers $14a, 14a, 11$ and $10a$ and gratings $R_1'$ and $T_i$ by etching upper layer $14a$ and in part layer $12a$ (FIG. $4a$).

The device according to the invention makes it possible to separate up to eight light signals of different wavelengths, while maintaining acceptable total light losses, which was not possible with the prior art multiplexers.

The above description has only been given in an explanatory and non-limitative form. Thus, all modifications to the embodiment of the multiplexer according to the invention are possible without passing beyond the scope of the invention. In particular, the parabolic mirrors at the entrance or exit of the multiplexer can be produced by only etching one or two layers of the light guides. Moreover, the different gratings can be produced by only etching the upper layer of the light guides or by etching the three layers of said guides. In the same way, the microguides can be obtained by etching the doped silicon dioxide layer 12 or $12a$ and then by covering everything with the upper oxide layer. Moreover, the thickness and nature of the different layers of the light guides can be modified, provided that the guide layer has a refractive index slightly higher than that of the two adjacent layers of the corresponding guide and that said layer constitutes a monomode guide layer. In the same way, the substrate can be made from a material other than silicon, such as glass, the first silicon dioxide layer then being obtained by chemical vapour phase deposition.

Moreover, the different gratings have been described as diffracting that part of the light beam only carrying one of the light signals and transmitting that part of the beam containing the other signals. Obviously, it is possible to use gratings transmitting that part of the light beam only containing one of the light signals and diffracting that part of the beam containing all the other signals.

Finally, the device according to the invention has been described in connection with the demultiplexing of light signals, i.e. for separating the signals from one another, but obviously said device can also be used for multiplexing these same signals, i.e. for forming from the n light signals of different wavelengths a single light signal carrying these signals. This reversibility of the device according to the invention is mainly linked with the use of parabolic achromatic mirrors 18, $m_1, \ldots, M_n$. In this case, each mirror $M_i$ or $M_i'$ is used for transforming the incident beam of wavelength $\lambda_i$ into a parallel beam and mirror 18 or 18a focusses the resultant beam, from grating $R_1$ and containing the n light signals.

What is claimed is:

1. An integrated demultiplexer for separating n light signals of different wavelengths, constituting an incident light beam transmitted by a first optical fiber and respectively reinjecting into n second optical fibers said n light signals, said demultiplexer formed from optical components etched in at least part of at least one light plan guide comprising, in the guide, achromatic input optics for making parallel said incident light beam from the first optical fiber, at least n passive gratings arranged in cascade, operating under Bragg conditions, each grating being used to diffract a first part of said light beam and to transmit a second part of said light beam, one of the two parts only carrying one of the n light signals, the other part carrying the other light signals, being transmitted in the direction of the following grating and n output optics in the form of achromatic parabolic mirrors associated with the n gratings, each output optics being used to focus that part of the light beam only consisting of one of the light signals and, wherein the demultiplexer is reversible.

2. A demultiplexer according to claim 1 wherein the part only carrying one of the light signals is the part of the light beam diffracted by the corresponding grating.

3. A demultiplexer according to claim 1, wherein the input optics is a parabolic mirror.

4. A demultiplexer according to claim 1 comprising an input microguide, inserted between the first optical fiber and the input optics, which has a structure similar to that of the first optical fiber.

5. A demultiplexer according to claim 1 comprising n output microguides associated with n output optics, said output microguides inserted respectively between the n output optics and the n second optical fibers respectively having a structure similar to that of the second optical fibers.

6. A demultiplexer according to claim 1, wherein the optical components are formed in a single light guide.

7. An integrated demultiplexer for separating n light signals of different wavelengths, constituting an incident light beam transmitted by a first optical fiber and respectively reinjecting into n second optical fibers said n light signals, said demultiplexer formed from optical components etched in at least part of at least one light plan guide comprising, in the guide, achromatic input optics for making parallel said incident light beam from the first optical fiber, at least n passive gratings arranged in cascade, operating under Bragg conditions, each grating being used to diffract a first part of said light beam and to transmit a second part of said light beam, one of the two parts only carrying one of the n light signals, the other part carrying the other light signals, being transmitted in the direction of the following grating and n output optics associated with the n gratings, each output optics being used to focus that part of the light beam only consisting of one of the light signals and, wherein the demultiplexer is reversible and, wherein the optical components are formed in two superimposed light guides, a lower guide having a high index variation and an upper guide having a lower index variation in which is propagated the incident light beam, the demultiplexer comprising n first gratings, each being used for diffracting a first part of the light beam and for transmitting a second part of said light beam, one of the two parts only carrying one of the n light signals, while the other part carrying the other light signals is transmitted in the direction of the following grating, the part only carrying one of the n light signals then being transferred from the upper guide to the lower guide, and n second gratings associated with the first gratings and each being used for retransferring that part of the light beam only carrying one of the n light signals from the lower guide to the upper guide.

8. A demultiplexer according to claim 7, comprising an input microguide, inserted between the first optical fiber and the input optics, which has a structure similar to that of the first optical fiber.

9. A demultiplexer according to claim 7, comprising n output microguides associated with n output optics, said output microguides inserted respectively between the n output optics and the n second optical fibers respectively having a structure similar to that of the second optical fibers.

10. A demultiplexer according to claim 7, wherein the first optical fiber and the n second optical fibers are monomode optical fibers and the upper light guide is a monomode guide.

11. A demultiplexer according to claim 7, wherein the two light guides comprise, produced in order, on a semiconductor substrate, a first layer, a second layer, a third layer and a fourth layer of material, the third layer being such that its refractive index is higher than that of the first and fourth layers and lower than that of the second layer, the first, second and third layers forming the lower light guide and the first, third and fourth layers the upper light guide.

12. A demultiplexer according to claim 11, wherein the substrate is of silicon, the first layer of undoped silicon dioxide, the second layer of silicon nitride, the third layer of doped silicon dioxide and the fourth layer of silicon dioxide in either the pure state or doped with an element which reduces its refractive index.

13. An integrated demultiplexer for separating n light signals of different wavelengths, constituting an incident light beam transmitted by a first optical fiber and respectively for reinjecting into n second optical fibers said n light signals, said demultiplexer formed from optical components etched in at least part of at least one plan light guide comprising, in the guide, an input microguide having a structure similar to that of the first optical fiber for receiving said incident light beam from said first optical fiber, an achromatic input parabolic mirror for making parallel said incident light beam from said input microguide, at least n passive gratings arranged in cascade, operating under Bragg conditions, each grating being used to diffract a first part of said light beam and transmit a second part of said light beam, one of the two parts only carrying one of the n light signals, the other part carrying the other light signals, being transmitted in the direction of the following grating and n achromatic output parabolic mirrors associated with the n gratings, each output mirror being used to focus that part of the light beam only consisting of one of the light signals, n output microguides associated with said n output mirrors and having a structure similar to that of the second optical fibers, each output microguide being used to optically couple the corresponding output mirror to the corresponding second optical fiber and, wherein the demultiplexer is reversible.

14. A demultiplexer according to claim 13, comprising a single light guide produced on a silicon substrate and formed, in order, of a first undoped silicon dioxide layer, a second doped silicon dioxide layer and a third silicon dioxide layer, which is either in the pure state or doped with an element to reduce the refractive index of said third layer, the doping of the material of the second layer being such that its refractive index is higher than that of the first and third layers, said input and output microguides being etched in said first layer, said input and output mirrors being etched in said three layers and said n gratings being etched in at least part of said second layer.

15. A demultiplexer according to claim 13, wherein the part only carrying one of the light signals is the part of the light beam diffracted by the corresponding grating.

16. A demultiplexer according to claim 13, wherein the input optics is a parabolic mirror.

17. A demultiplexer according to claim 13, wherein the output microguides are curved.

18. A demultiplexer according to claim 13, wherein the optical components are formed in a single light guide.

19. A demultiplexer according to claim 18, wherein the first optical fiber and the n second optical fibers are monomode optical fibers and the single light guide is a monomode guide.

20. A demultiplexer according to claim 18, wherein the single light guide comprises, produced, in order, on a silicon substrate, a first undoped silicon dioxide layer, a second doped silicon dioxide layer and a third silicon dioxide layer, which is either in the pure form or doped with an element to reduce the refractive index of said layer, the doping of the material of the second layer being such that its refractive index is higher than that of the first and third layers.

21. A demultiplexer according to claim 20, wherein the doped silicon dioxide layer is doped with phosphorus, germanium or titanium.

22. A demultiplexer according to claim 13, comprising two superimposed light guides, a lower guide having a high index variation and an upper guide having a lower index variation in which is propagated the incident light beam, the demultiplexing device comprising n first gratings, each being used for diffracting a first part of the light beam and for transmitting a second part of said light beam, one of the two parts only carrying one of the n light signals, while the other part carrying the other light signals is transmitted in the direction of the following grating, the part only carrying one of the n light signals then being transferred from the upper guide to the lower guide, and n second gratings associated with the first gratings and each being used for retransferring that part of the light beam only carrying one of the n light signals from the lower guide to the upper guide.

23. A demultiplexer according to claim 22, wherein the two light guides comprise, in order, on a silicon substrate, a first undoped silicon dioxide layer, a second silicon nitride layer, a third doped silicon dioxide layer and a fourth silicon dioxide layer, which is either in the pure state or doped with an element which reduces the refractive index of said fourth layer, the first, second and third layers forming the lower light guide and the first, third and fourth layers forming the upper light guide.

24. A demultiplexer according to claim 23, wherein said input and output microguides are etched in said first layer, said input and output mirrors are etched in said four layers, said n first and second gratings are etched in at least part of the second layer.

* * * * *